No. 688,388. Patented Dec. 10, 1901.
W. H. CARTWRIGHT.
EDUCATIONAL APPLIANCE.
(Application filed Mar. 2, 1901.)
(No Model.)
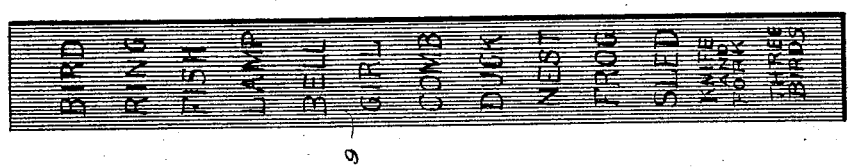
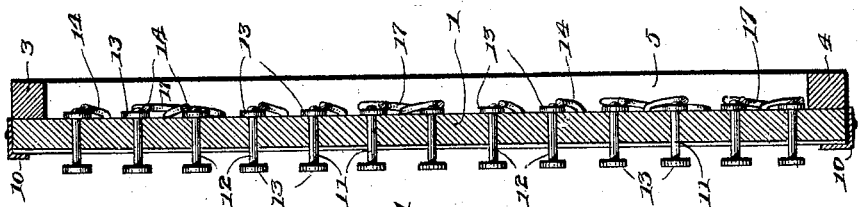
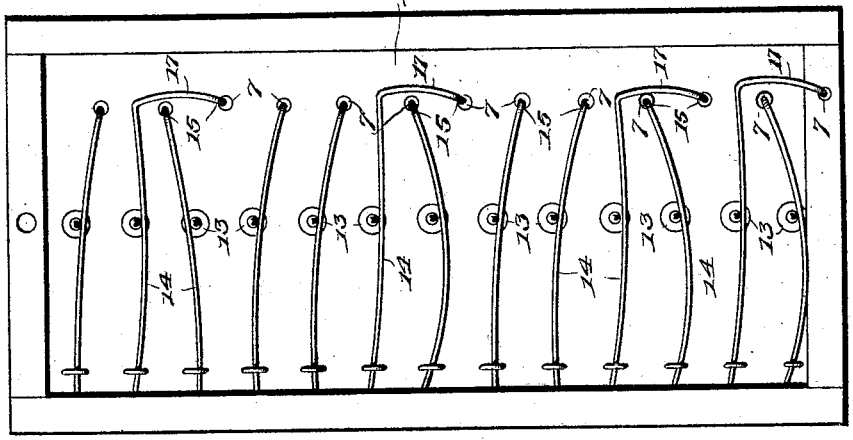
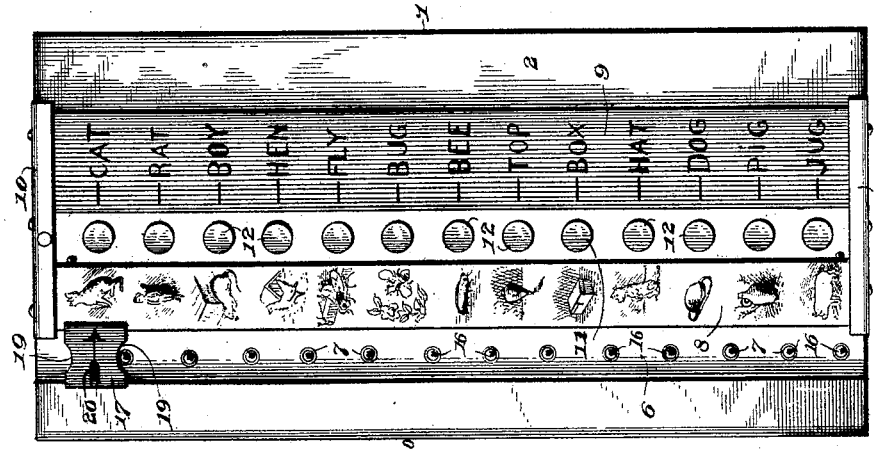

UNITED STATES PATENT OFFICE.

WILLIAM H. CARTWRIGHT, OF BLAKELEY, MINNESOTA.

EDUCATIONAL APPLIANCE.

SPECIFICATION forming part of Letters Patent No. 688,388, dated December 10, 1901.

Application filed March 2, 1901. Serial No. 49,621. (No model.)

*To all whom it may concern:*

Be it known that I, WILLIAM H. CARTWRIGHT, a citizen of the United States, residing at Blakeley, in the county of Scott and State of Minnesota, have invented a new and useful Educational Appliance, of which the following is a specification.

This invention relates to an educational device; and the object of the same is to provide simple and effective means for teaching a child or scholar the fundamental principles of orthography and reading and also the names of different objects, and involving such mode of operation as to cause a use of thought and the faculties generally in conjunction with the several mechanical parts of the device in arriving at the desired result without encouraging a full mechanical operation or dependence on the part of the child or scholar.
The invention consists in the construction and arrangement of the several parts which will be more fully hereinafter described and claimed.

In the drawings, Figure 1 is a front elevation of the improved device. Fig. 2 is a rear elevation of the same. Fig. 3 is a transverse vertical section through the center of the device. Fig. 4 is a detail perspective view of a movable block forming part of the complement of the improved device. Fig. 5 is a detail elevation of the answer-strip removably carried by a portion of the device and reversible to expose different matter on opposite sides thereof.

Similar numerals of reference are employed to indicate corresponding parts in the several views.

The numeral 1 designates the body of the board, which has a substantially smooth face 2 at the front and rear side and upper and lower strips 3 and 4 to provide a rear recess 5. The board is adapted to be fastened to a suitable support for convenience in operation by the child or scholar and adjacent to the left-hand side thereof is a groove 6. Centrally lined in the said groove and spaced apart at regular intervals are a plurality of vertical openings 7, which are vertically arranged and extend completely through the board in a transverse direction, as shown by Fig. 2, and along the right edge of the said groove is a removable and reversible object-strip 8, which has a plurality of different objects on opposite sides and coöperates with a reversible answer-strip 9 near the right side of the face 2, both strips 8 and 9 being replaceable by other similar strips and the opposite ends of the same removably held in the front overprojecting portions of upper and lower clips 10, secured to the ends of the board. The objects and answers on the respective strips 8 and 9 are arranged in transverse alinement and irregularly for a purpose which will be hereinafter set forth.

In the center of the board or at a point between the strips 8 and 9 a series of vertically-alined push-pins 11 are mounted in the board and are supplied with outer heads 12 and rear circular flanges 13, located in the recess at the back of the board, there being as many of the said pins as there are characters or objects and answers on the several strips set forth. The flanges are in continual operative engagement with spring-arms 14, located in the recess at the back of the board, and have the one extremity of each secured to the back of the board and the opposite extremity bent at an angle to form a stop 15, the said stops being freely movable through the openings 8 and normally projecting in advance of the plane of the front face of the groove. When the pins 11 are pushed rearwardly, the arms are moved back and the stop ends 15 thereof are withdrawn rearward to clear the front face of the groove. Some of the arms also have depending angular extensions 16, from which the stops 15 terminally project, and these arms with the extensions are arranged in alternation between others that are regularly disposed to break the alined sequence of the supports or stops 15 relatively to the pins 11, so that the second, fifth, and ninth arms, counting from the uppermost one, respectively, carry the third, seventh, and eleventh stops, the twelfth arm also having an extension which carries the thirteenth stop, and the thirteenth arm at the bottom has the eleventh stop. This irregularity in the arrangement of the arms causes the child or scholar to exercise thought in arriving at the result sought instead of mechanically depending on a regular sequential disposition of the arms and stops to obtain the answer in each instance, and also encourages a thoughtful study, which will lead to an acquaintance with the word or name sought, as well as its orthographical construction. The strips 8 and 9 will respectively have the objects and answers arranged to correspond with the irregular arrangement of the stops, as set forth.

With the improved board a series of two blocks 17 are adapted to be used, though for ordinary uses only one block will be employed. It is obvious, however, that the number of blocks could be increased, and the augmentation of the number will require but a simple duplication, as they will all be of the same construction. Each block is formed with angularly or V shaped grooved sides 18 to engage the side walls of the groove 6, each of the blocks being also formed with upper and lower center grooves or transversely-extending cavities 19 to form seats for the stops 15. Each block is preferably thicker than the depth of the groove 6 and may be reversed, and either one or both faces have an indicating device, such as an arrow 20, which is arranged to point to the right and is adapted to transversely aline with objects on the strip 8 and answers on the strip 9. It is not actually necessary that the block be reversible; but it may be convenient at times to have it so, and also to apply different colors to the opposite faces, and when a second block is used it may also have a still different colored face or faces. As many of the strips 8 and 9 may be furnished with each board as may be deemed expedient and corresponding to the age of the child or children using the same, and it will be understood that young children will have simple objects and words to master and the said objects and words be rendered more complex for older children. The device can be made almost noiseless by covering the pins with felt or the like and also deadening other parts.

The parent or teacher must first arrange the strips for the child or scholar and also enter the block for the first few times. The parent or teacher then instructs the child to look at the first picture on the strip 8 and indicated by the block and tell what it is. The child will naturally say "cat," and he is then instructed to find such word on the strip 9 and to press the button or pin near to or corresponding with the same, and as soon as the child does this the block falls one space and the indicator on the block points to another object. The child will soon learn that the block will always refuse to fall unless he presses the button opposite the right word and that the said block always responds to his touch when by thoughtful intelligence he presses the button opposite the word which corresponds to the object indicated by the block. If the child does not press the right pin or button every time, which will be made known to him by a failure of the block to fall, he will try another button or pin, and if the second fails he will continue to search for the correct word and to press the buttons or pins until the block does fall, and when the block falls he will naturally note and carefully study the word opposite the successful pin or button which brought the block down. If the parent or teacher uses the device to ascertain whether the child has learned his lesson, two blocks may be entered at once instead of one, each block bearing an indicating-arrow. In this use the child is instructed to take the two blocks completely through the groove 6 by pressing one button at a time and not allow them to be at any time more than one space apart. This alternating from the object indicated by one block to the object indicated by the other doubles the confusion, and no child or other person can go through this drill without making mistakes or pressing wrong pins or buttons until he knows the words, and therefore the construction cannot take a mechanical turn. If the child or scholar knows the words perfectly, this double drill can be carried on without making a mistake or pressing a wrong button. By the construction and arrangement of parts set forth and the operations specified a child or scholar may be readily taught to read and also instructed in the primary principles of orthography.

There are many obvious changes that could be made in the present device without departing in the least from the principle involved, and among others may be mentioned the idea of combining the object and answer strip in one device and disposing both adjacent to the block-groove with the pins or push devices located to the right of both strips—in other words, both strips can be located between the pins and the block instead of being separated by said pins, as shown. Of course a number of these combined strips could also be supplied with each appliance. Another obvious change would be to have the strips and pins disposed horizontally or to read longitudinally of the board and the block likewise shiftable. The indicator on the block might be raised and its position varied to change the direction of indication. These and other changes can be made in the form, size, proportions, and minor details of the several parts.

Having thus described the invention, what is claimed as new is—

In an educational device, the combination of a board with a groove at one side portion thereof, an indicating device gravitatingly movable by a step-by-step operation in said groove, a strip removably mounted adjacent to said groove and having pictures of different objects thereon in vertical alinement, an answer-strip at a distance from said object-strip provided with names corresponding to the objects on the latter and also removably applied, and clips at the upper and lower ends of the board which are long enough to receive thereunder the upper and lower ends of the said strips.

In testimony that I claim the foregoing as my own I have hereto affixed my signature in the presence of two witnesses.

WILLIAM H. CARTWRIGHT.

Witnesses:
A. J. IRWIN,
HARRY A. IRWIN.